United States Patent
Davis et al.

(10) Patent No.: US 9,990,832 B2
(45) Date of Patent: Jun. 5, 2018

(54) OCCUPANCY DETECTION BY SOCIAL MEDIA

(71) Applicant: Vivint, Inc., Provo, UT (US)

(72) Inventors: Aaron Davis, Pleasant Grove, UT (US);
Brandon Bunker, Highland, UT (US);
Rongbin Lanny Lin, Orem, UT (US);
Shiwei Liu, Draper, UT (US)

(73) Assignee: Vivint, Inc., Provo, UT (US)

(*) Notice: Subject to any disclaimer, the term of this patent is extended or adjusted under 35 U.S.C. 154(b) by 0 days. days.

(21) Appl. No.: 15/097,474

(22) Filed: Apr. 13, 2016

(65) Prior Publication Data
US 2017/0301213 A1     Oct. 19, 2017

(51) Int. Cl.
| | | |
|---|---|---|
| G08B 21/22 | (2006.01) | |
| H04L 12/58 | (2006.01) | |
| G06Q 50/00 | (2012.01) | |
| G06N 7/00 | (2006.01) | |

(52) U.S. Cl.
CPC ............ G08B 21/22 (2013.01); G06N 7/005 (2013.01); G06Q 50/01 (2013.01); H04L 51/32 (2013.01)

(58) Field of Classification Search
None
See application file for complete search history.

(56) References Cited

U.S. PATENT DOCUMENTS

| | | | |
|---|---|---|---|
| 8,558,179 B2 | 10/2013 | Filson et al. | |
| 2012/0287245 A1 | 11/2012 | Holland et al. | |
| 2013/0030732 A1 | 1/2013 | Shetty et al. | |
| 2014/0039788 A1 | 2/2014 | Fuehrer | |
| 2014/0266669 A1 | 9/2014 | Fadell et al. | |
| 2016/0092959 A1* | 3/2016 | Gross | G06K 9/00671 705/26.62 |
| 2016/0261932 A1* | 9/2016 | Fadell | H04Q 9/00 |
| 2016/0261984 A1* | 9/2016 | Shrinath | H04W 4/021 |
| 2017/0076263 A1* | 3/2017 | Bentz | F24F 11/0034 |

* cited by examiner

*Primary Examiner* — Leon-Viet Nguyen
(74) *Attorney, Agent, or Firm* — Holland & Hart LLP

(57) ABSTRACT

A method for security and/or automation systems is described. In one embodiment, the method includes receiving social media data via a signal, analyzing the social media data based at least in part on a first parameter, identifying occupancy information based at least in part on the analyzing, and assessing a structure occupancy based at least in part on the identifying.

20 Claims, 8 Drawing Sheets

OCCUPANCY DETECTION BY SOCIAL MEDIA

BACKGROUND

The present disclosure, for example, relates to security and/or automation systems, and more particularly to detecting occupancy of a premises in relation to a security and/or automation system.

Security and automation systems are widely deployed to provide various types of communication and functional features such as monitoring, communication, notification, and/or others. These systems may be capable of supporting communication with a user through a communication connection or a system management action.

Presently, security and automation systems may incorrectly assess occupancy of a premises or may be less confident about an assessment. For example, a security and/or an automation system may incorrectly determine a home is empty when an occupant is at home sick or may have a low confidence level about whether the determined occupancy status is accurate.

SUMMARY

The present systems and methods relate to automation and/or security systems. Specifically, the present systems and methods relate to detecting occupancy of a premises such as a home, a condo, an apartment, an office, etc. The systems and methods may include monitoring social media posts associated with an occupant related to the premises, detecting occupancy-related information in the monitored social media posts, and analyzing occupancy of the premises based at least in part on the detected occupancy-related information.

A method for security and/or automation systems is described. In one embodiment, the method may include receiving social media data via a signal, analyzing the social media data based at least in part on a first parameter, identifying occupancy information based at least in part on the analyzing, and assessing a structure occupancy based at least in part on the identifying. The first parameter may include at least one of a word, a phrase, a character combination, an emoticon, a hashtag, a photo, a video, and location information such as a global positioning system (GPS) tag. In some cases, the first parameter may include at least one of object recognition, object detection, facial recognition, and time stamp information. The social media data may include social media data of at least a first user and a second user (e.g., an occupant and a social media connection of the occupant).

In some embodiments, the method may include receiving sensor data from a sensor located at a structure. The sensor data may be related to the structure occupancy. The analyzing may include analyzing the sensor data. In some cases, analyzing the sensor data may be based at least in part on a second parameter.

In some embodiments, the method may include assessing a first probability of the structure occupancy based at least in part on analyzing the social media data based at least in part on the first parameter, and/or assessing a second probability of the structure occupancy based at least in part on analyzing the sensor data based at least in part on the second parameter. The first and/or second probabilities may include a future probability.

In some embodiments, the method may include transmitting a notification based at least in part on the assessing.

In some cases, assessing the probability of the structure occupancy may include assessing a first probability of the structure occupancy based at least in part on analyzing the social media data of the first user and/or assessing a second probability of the structure occupancy based at least in part on analyzing the social media data of the second user.

An apparatus for security and/or automation systems is also described. The device may include a processor and memory in electronic communication with the processor. The memory may store instructions that may be executable by the processor to receive social media data via a signal, analyze the social media data based at least in part on a first parameter, identify occupancy information based at least in part on the analyzing, and assess a structure occupancy based at least in part on the identifying.

A non-transitory computer-readable medium storing computer-executable code for security and/or automation systems is also described. The computer-executable code may be executable by a processor to receive social media data via a signal, analyze the social media data based at least in part on a first parameter, identify occupancy information based at least in part on the analyzing, and assess a structure occupancy based at least in part on the identifying.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, including their organization and method of operation together with associated advantages, will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components, including those having a dash and a second reference label, apply to other similar components. If only the first reference label is used in the specification, the description is applicable to any one of the similar components having the same first reference label irrespective of the second reference label.

DETAILED DESCRIPTION

Figure 1:
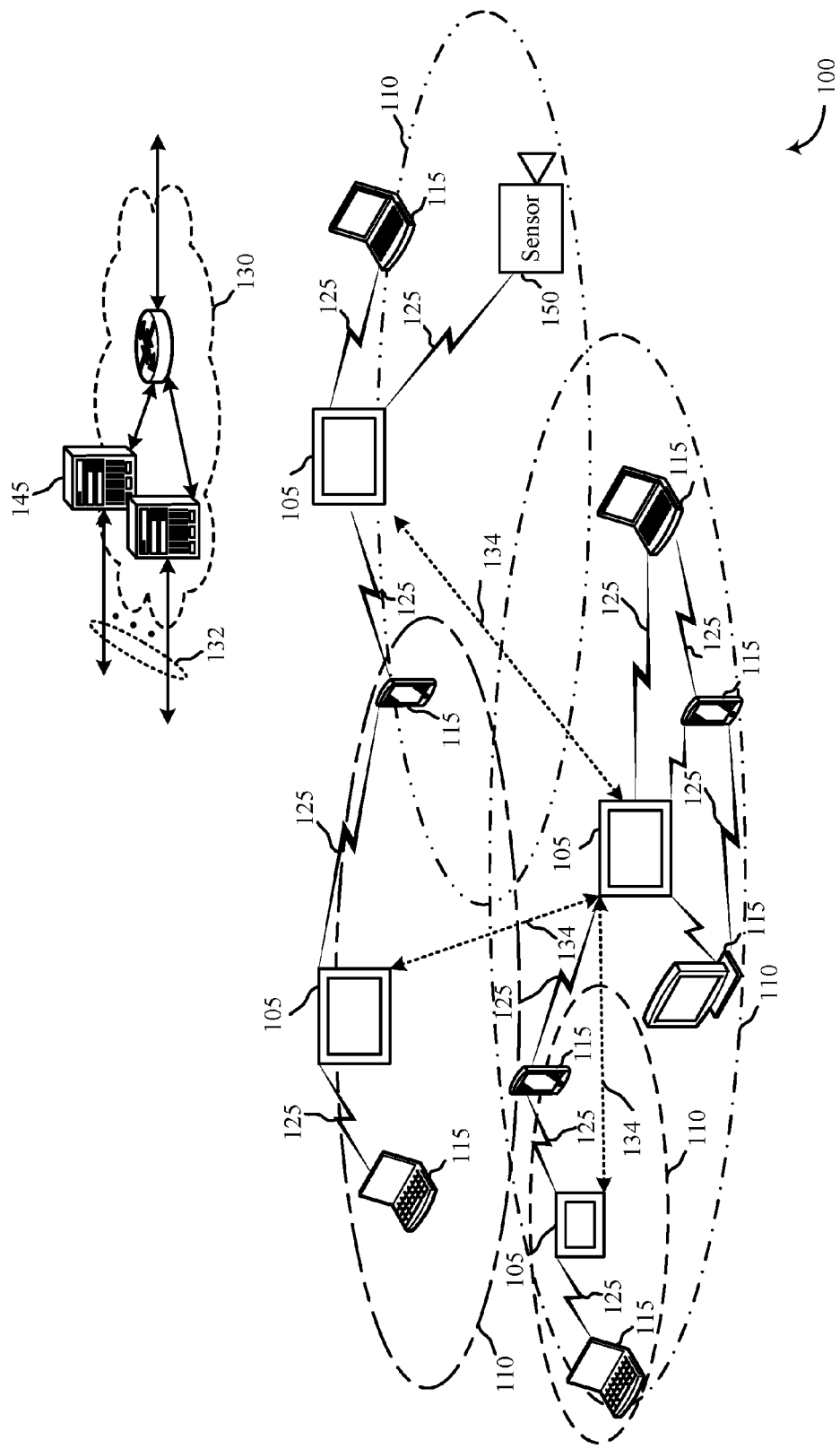
FIG. 1 shows a block diagram relating to a security and/or an automation system, in accordance with various aspects of this disclosure.

The problems solved by the present systems and methods include increasing the accuracy of structure occupancy detection based on monitoring and determining user states, among others. Current systems are not wholly accurate in calculating occupancy in general and, for specific situations where people may exhibit abnormal behavior (i.e., being sick, on vacation, etc.), occupancy detection is even less accurate. Some systems use one or more sensors, but such sensors may be misplaced, may not provide sufficient data to infer and/or determine true occupancy, and/or may not account for abnormal behavior, etc.

The systems and methods solve these and other problems by using electronic media updates alone, or in combination with other data such as sensor data, to accurately determine structural occupancy. The present systems and methods can reduce false positives that the system may identify.

Some embodiments relate to systems, methods, and/or related devices for detecting information related to social media (electronic posts, information, and/or updates) and/or structure occupancy detection. Some embodiments specifically relate to security/home automation systems.

In some embodiments, the present systems and methods include using electronic information from social media alone and/or in combination with other data related to occupancy detection. This other data may include sensor data from within and/or outside a structure, like a home. In some embodiments, the system may use sensor data to assess a probability and/or a confidence level, and then may use social media posts to modify, change, and/or reassess a probability and/or a confidence level. In other embodiments, the system may use social media posts to assess a probability and/or a confidence level, and then may use sensor data to modify, change, and/or reassess a probability and/or a confidence level.

Potential social media post information that can be used by the system for occupancy detection may include: words, phrases, hashtags, punctuation emoticons (i.e., =), :), ;), etc.), graphical emoticons, connections of other social media members, photos, time stamps, global positioning system (GPS) data, and/or combinations of the above, among others. For example, a user may post "in the waiting room . . . " while at a doctor's office and the system can use location information (e.g., GPS) to identify the "waiting room" and may make determinations and/or take other actions based on this information. In some embodiments, the system may be able to analyze segments of certain data, such as image and/or video data. For example, if a user posts a picture of their face that also includes their bed and/or a tissue box, the system may be able to perform object recognition and/or facial recognition to determine the bed and/or the tissue box, which may aid in assessing a probability and/or a confidence level.

The system may use an application programming interface (API) to receive the social media data and/or some other means. The system may ask the user for permission to access the social media data (through an app, an email, a text, and/or a notification, etc.) and/or may use publicly available information without requesting access. This information may be transmitted between servers, using a security system panel, and/or from a phone to a local storage device, etc.

In some embodiments, one or more social media posts may be used to trigger sensor monitoring. For example, a user may post "At home, feeling sick," and the system may be triggered to perform certain monitoring and/or additional monitoring. For example, the system may analyze information in the post to determine a meaning from the post. The system may parse the text in the post to interpret the meaning and/or detect keywords such as "home," "sick," "holiday," "away," "vacation," etc. The system may detect location information in the post such as a GPS tag on the post and/or an image in the post. Additionally, or alternatively, the system may analyze one or more images in the post. The system may perform facial recognition to identify one or more people in the image. In some cases, the system may perform object recognition to identify a setting such as indoors or outdoors, identify an object such as a piece of furniture in the premises (e.g., a lamp, nightstand, headboard, desk, chair, oven, couch, etc.), and/or identify a landmark such as the Golden Gate bridge, Lincoln memorial, etc. The system may identify a hashtag (e.g., #feelingsick, etc.) and/or emoticon (e.g., ☺, etc.) in the post to further assist interpreting a meaning of the post.

In some embodiments, the present systems and methods may not only use the social media posts of User A, but may also use information related to other people. For example, if User A is connected to User B on a social network, the system may examine User B's accessible social media posts in order to assess information about User A. So if User B posted "feeling sick" three days earlier, the system may use this information to analyze User A's information and, in some cases, change a probability and/or a confidence level based at least in part on User B's information. In some cases, the system may assign a weight to User B based on a determined probability of interaction between User A and User B. For example, the system may determine whether User B lives in the same neighborhood as User A, whether User A and User B work at the same place, and/or whether User A and User B interact in person, etc. Accordingly, the system may assign a higher weight to User B if User A and User B have one or more interactions, such as an in-person interaction.

In some embodiments, the systems and/or the methods may include algorithms and/or steps to compare, analyze, reconcile, and/or otherwise evaluate multiple data types. For example, the system may determine that a structure is unoccupied, but then a user may post "At home, in bed, sick." The system and/or the method would then be able to use both pieces of information to assess a probability and/or a confidence level. In some cases, the system may assign weights to information derived from a social media post and/or data from a sensor. For example, the system may provide a first weight to the social media data and a second weight to the sensor data where the first and second weights may be the same or different (e.g., a weight of 1.0 to social media data and a weight of 1.5 to sensor data, or a weight of 0.5 to sensor data and a weight of 0.75 to sensor data, etc.). In some cases, the system may present the data derived from the social media post and/or sensor and/or query the user for input.

In some embodiments, based at least in part on social media posts and/or automation data, the system may send one or more signals to other related and/or connected systems. For example, if a user posts "early weekend, on my way home . . . " the system may be able to send a signal to a related system (e.g., heating ventilation air conditioning (HVAC), lighting, etc.) based at least in part on the social media post, even if the system's learned behavior would otherwise not reflect this behavior The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 illustrates an example of a communications system 100 in accordance with various aspects of the disclosure. The communications system 100 may include control panels 105, devices 115, and/or a network 130. The network 130 may provide user authentication, encryption, access authorization, tracking, Internet Protocol (IP) connectivity, and other access, calculation, modification, and/or functions. The control panels 105 may interface with the network 130 through wired and/or wireless communication links 132 to communication with one or more remote servers 145. The control panels 105 may perform communication configuration, adjustment, and/or scheduling for communication with the devices 115, or may operate under the control of a controller. In various examples, the control panels 105 may communicate, either directly or indirectly (e.g., through network 130), with each other over wired and/or wireless communication links 134. Control panels 105 may communicate with a back end server (such as the remote servers 145) directly and/or indirectly using one or more communication links.

The control panels 105 may wirelessly communicate with the devices 115 via one or more antennas. Each of the control panels 105 may provide communication coverage for a respective geographic coverage area 110. In some examples, control panels 105 may be referred to as a control device, a base transceiver station, a radio base station, an access point, a radio transceiver, or some other suitable terminology. The geographic coverage area 110 for a control panel 105 may be divided into sectors making up only a portion of the coverage area. The communications system 100 may include control panels 105 of different types. There may be overlapping geographic coverage areas 110 for one or more different parameters, including different technologies, features, subscriber preferences, hardware, software, technology, and/or methods. For example, each control panel 105 may be related to one or more discrete structures (e.g., a home, a business) and each of the one more discrete structures may be related to one or more discrete areas. In other examples, multiple control panels 105 may be related to the same one or more discrete structures (e.g., multiple control panels relating to a home and/or a business complex).

The devices 115 are dispersed throughout the communications system 100 and each device 115 may be stationary and/or mobile. A device 115 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a sensor, a camera, and/or the like. A device 115 may also include or be referred to by those skilled in the art as a user device, a sensor, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. Sensor 150 may include and/or be one or more sensors that sense: proximity, motion, temperatures, humidity, sound level, smoke, structural features (e.g., glass breaking, window position, door position), time, geo-location data of a user and/or a device, distance, biometrics, weight, speed, height, size, preferences, light, darkness, weather, time, system performance, and/or other inputs that relate to a security and/or an automation system. A device 115 may be able to communicate through one or more wired and/or wireless connections with various components such as control panels, base stations, and/or network equipment (e.g., servers, wireless communication points, etc.) and/or the like.

The communication links 125 shown in communications system 100 may include uplink (UL) transmissions from a device 115 to a control panel 105, and/or downlink (DL) transmissions, from a control panel 105 to a device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

In some embodiments, of communications system 100, control panels 105 and/or devices 115 may include one or more antennas for employing antenna diversity schemes to improve communication quality and reliability between control panels 105 and devices 115. Additionally or alternatively, control panels 105 and/or devices 115 may employ multiple-input, multiple-output (MIMO) techniques that may take advantage of multi-path, mesh-type environments to transmit multiple spatial layers carrying the same or different coded data.

While the devices 115 may communicate with each other through the control panel 105 using communication links 125, each device 115 may also communicate directly with one or more other devices via one or more direct communication links 134. Two or more devices 115 may communicate via a direct communication link 134 when both devices 115 are in the geographic coverage area 110 or when one or neither devices 115 is within the geographic coverage area 110. Examples of direct communication links 134 may include Wi-Fi Direct, BLUETOOTH®, wired, and/or, and other P2P group connections. The devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

The communications system 100 may monitor occupancy of a premises based at least in part on social media data. In conjunction with the control panels 105, devices 115, network 130, and/or communication links 125 and/or 134, the communications system 100 may monitor one or more social media sites associated with an occupant of a home and/or office and/or a person associated with a home and/or office. For example, an occupant may post data to the social media site that includes location and time information. In some cases, the social media post may include hashtags, emoticons, and/or images, among other things. An image may include a face and/or object and the communications system 100 may enable the devices 115 and/or control panels 105 to recognize the face and/or object in the image or in multiple images. The location and time information may include a timestamp associated with a post, a location stamp associated with a post, a GPS tag in the post, and/or a GPS tag in an image that is part of the post. In some cases, the text and or symbols (e.g., emoticons, etc.) may be analyzed to detect location-based information from the post. Based on this location and/or time information, the communications system 100 may assess a probability and/or a confidence level that the occupant is either at or away from the home or office. In some cases, the communications system 100 may analyze data from one or more sensors (e.g., sensor 150) to further refine a probability of occupancy. Accordingly, communications system 100 may detect an occupancy of a premises based on data from a social media site.

Figure 2:
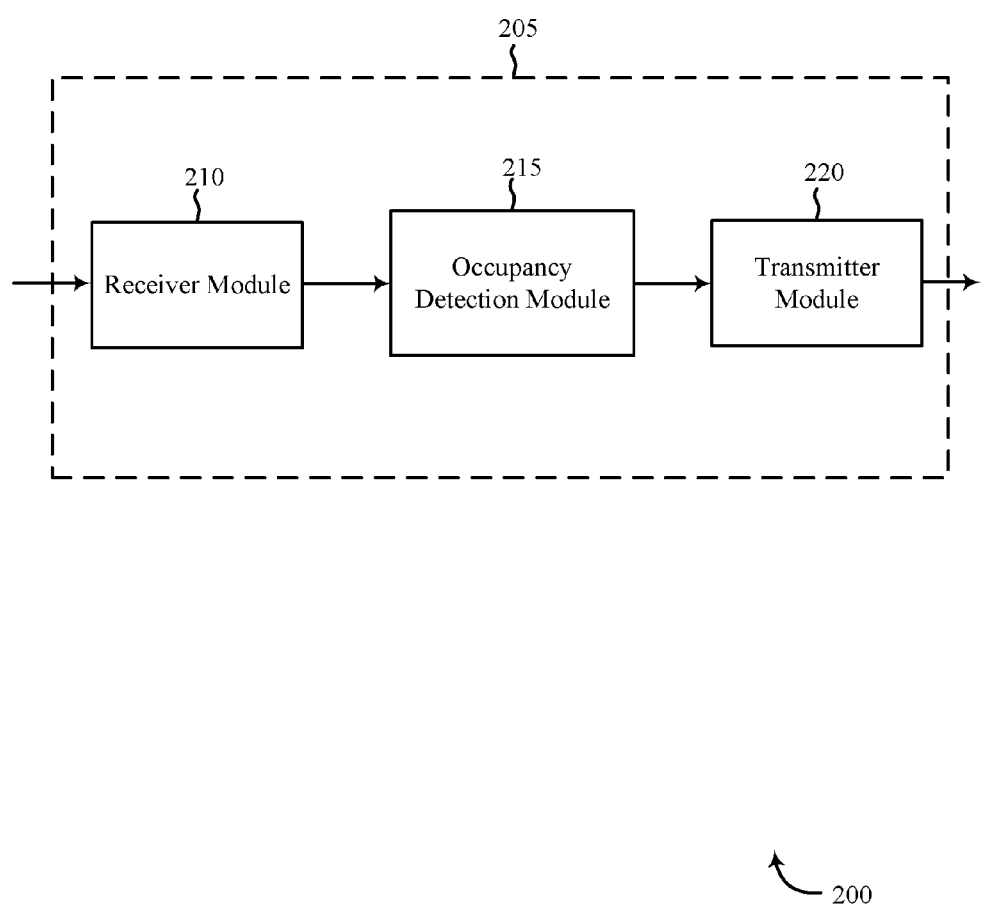
FIG. 2 shows a block diagram of a device relating to a security and/or an automation system, in accordance with various aspects of this disclosure.

FIG. 2 shows a block diagram 200 of an apparatus 205 for use in electronic communication, in accordance with various aspects of this disclosure. In one embodiment, the apparatus 205 may be an example of one or more aspects of control panel 105 described with reference to FIG. 1. In some embodiments, apparatus 205 may be an example of a server, a desktop, a laptop, and/or a mobile computing device, as illustrated by device 115 of FIG. 1.

The apparatus 205 may include a receiver module 210, an occupancy detection module 215, and/or a transmitter module 220. The apparatus 205 may also be or include a processor. Each of these modules may be in communication with each other directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented in whole or in part with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive data and/or control information from another device such as a control panel, computing device, social media server, a sensor, and/or a camera, etc. Information may be passed on to the occupancy detection module 215, and/or to other components of the apparatus 205.

Occupancy detection module 215 may enable methods for occupancy detection in conjunction with a security and/or an automation system. Upon identifying data from a social media site associated with an occupant of a home or an office and/or a person associated with a home and/or an office, occupancy detection module 215 performs analysis on the social media data to determine and/or verify occupancy of the home or office. In some embodiments, occupancy detection module 215 may detect occupancy-related data from one or more sensors such as motion sensors, camera sensors, thermostat sensors, etc. (e.g., sensor 150 of FIG. 1). Based on this sensor data, occupancy detection module 215 may assess a probability and/or confidence level of occupancy of a home and/or an office. The occupancy detection module 215 may then query a social media site associated with one or more people to acquire social media data and/or further refine the calculated probability of occupancy based at least in part on an analysis of the social media data. In some cases, occupancy detection module 215 may analyze the social media data and assess a probability of occupancy. The occupancy detection module 215 may then analyze data from one or more sensors at the home or premises to modify the calculated probability of occupancy. In some cases, the occupancy detection module 215 may calculate a probability of occupancy based on sensors and modify this calculation based on one or more social media posts. For example, occupancy detection module 215 may calculate a 70% probability the premises is unoccupied based on detecting an occupant leave the premises and the premises being armed to "Away." For example, occupancy detection module 215 may calculate a 30% probability the premises is occupied based on detecting an occupant leaving the premises and the premises being armed to "Away." Upon identifying a social media post that indicates an occupant is at the premises (e.g., "I'm sick at home today," GPS tag, hashtags, emoticons, etc.), the system may adjust the probability to 75% probability that the premises is occupied. The apparatus 205 may perform various functions based on this analysis and/or determination. For example, a control panel (e.g., control panel 105) may switch the security system status from "Away" to "Stay" upon adjusting the probability to 75%, which may be greater than or equal to a predetermined threshold.

The transmitter module 220 may transmit the one or more signals received from other components of the apparatus 205. The transmitter module 220 may transmit data and/or controls signals to a control panel and/or sensor associated with the security and/or automation system. In some embodiments, transmitter module 220 may transmit data and/or controls signals based at least in part on social media data, analysis related to the social media data, sensor data, analysis related to sensor data, and/or other information. The data and/or control signals transmitted by the transmitter module 220 may be associated with the occupancy detection performed by the occupancy detection module 215. For example, transmitter module 220 may transmit data from one or more sensors and/or data from a social media site. In some examples, the transmitter module 220 may be co-located with the receiver module 210 in a transceiver module.

Figure 3:
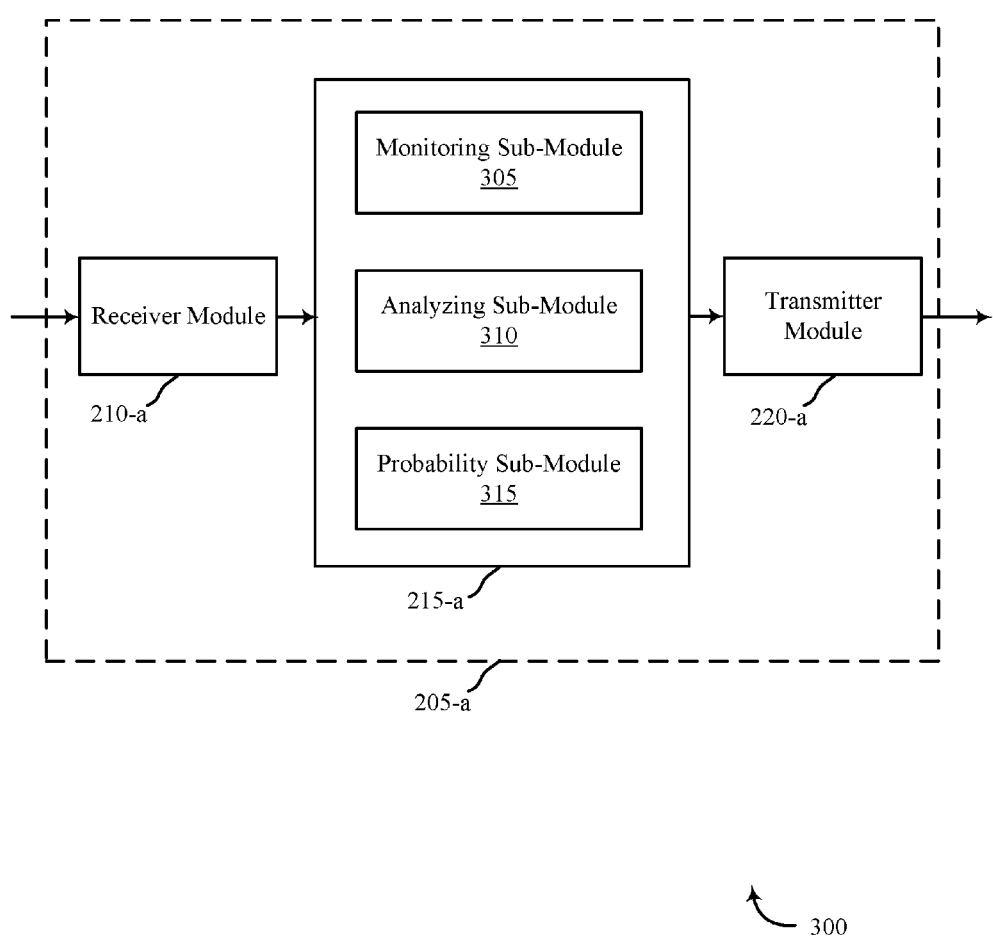
FIG. 3 shows a block diagram of a device relating to a security and/or an automation system, in accordance with various aspects of this disclosure.

FIG. 3 shows a block diagram 300 of an apparatus 205-*a* for use in wireless communication, in accordance with various examples. The apparatus 205-*a* may be an example of one or more aspects of a control panel 105 and/or a device 115 described with reference to FIG. 1. It may also be an example of an apparatus 205 described with reference to FIG. 2. The apparatus 205-*a* may include a receiver module 210-*a*, an occupancy detection module 215-*a*, and/or a transmitter module 220-*a*, which may be examples of the corresponding modules of apparatus 205. The apparatus 205-*a* may also include a processor. Each of these components may be in communication with each other directly and/or indirectly. The occupancy detection module 215-*a* may include monitoring sub-module 305, analyzing sub-module 310, and/or probability sub-module 315. The receiver module 210-*a* and the transmitter module 220-*a* may perform the functions of the receiver module 210 and the transmitter module 220, of FIG. 2, respectively.

In one embodiment, monitoring sub-module 305 may receive social media data via a signal. For example, monitoring sub-module 305 may monitor a social media account of an occupant of a premises and/or another person. Thus, monitoring sub-module 305 may monitor a FACEBOOK® account, TWITTER® account, INSTAGRAM® account, GOOGLE+® account, PINTEREST® account, LINKED-IN® account, and/or accounts of other social media sites associated with the one or more users.

The social media data may include social media data of at least a first user and a second user. In some cases, monitoring sub-module 305 may acquire social media data generated by the occupant of the premises. Additionally, and/or alternatively, monitoring sub-module 305 may acquire social media data from another user of the social media site. For example, a friend, family member, or other type of social media connection of the occupant of the premises (or someone associated with a premises) may post content that is available to the social media account of the occupant. For instance, a social media connection may post to the occupant's FACEBOOK® page. Thus, monitoring sub-module 305 may gather data from the posts of the occupant and/or may gather data from posts generated by other users.

In one embodiment, analyzing sub-module 310 may analyze the social media data based at least in part on a first parameter. Parameters of the social media data to be analyzed may include at least one of: a post, a word, a phrase, a character combination, a punctuation emoticon such as :), a graphical emoticon or emoji, a hashtag, a photo, a symbol, an image, and/or a video, among others. Additionally, or alternatively, parameters of the social media data may include object detection, object recognition, landscape detection, landmark detection, location information (e.g., GPS tag of a photo and/or post), facial recognition, and/or time stamp information (e.g., timestamp of a photo and/or post), among others.

In some embodiments, analyzing sub-module 310 may identify occupancy information based at least in part on the analyzing. For example, analyzing sub-module 310 may identify text such as "I'm sick at home" or "There are no lines at DISNEYLAND® today" from posts made by an occupant of the premises. Based on this text, analyzing sub-module 310 may detect and/or confirm that the occupant is at home or away, that the occupant is sick, and/or that the occupant is on vacation, etc. In some cases, a post on the occupant's social media account may include location information based on a GPS tag, local positioning system (LPS) tag, WiFi triangulation, signal strength proximity detection, and/or the like. Thus, analyzing sub-module 310 may detect a location of the occupant based on associated location information (e.g., detect a post is generated from a device at home, a device at work, etc.). Likewise, analyzing sub-module 310 may detect hashtags such as #sickathome or #iheartnewyork, and from this, may detect and/or confirm that the occupant is at home or away, that the occupant is sick, and/or that the occupant is on vacation, etc.

In another example, analyzing sub-module 310 may derive information from a photo and/or video posted in relation to a social media account of the occupant. For example, a photo and/or video posted on the occupant's social media account may include location information based on a GPS tag, LPS tag, WiFi triangulation, signal strength proximity detection, and the like. In some cases, analyzing sub-module 310 may detect an object from a photo and/or video. For example, analyzing sub-module 310 may detect a landscape or landmark (e.g., Golden Gate Bridge, Statue of Liberty, Eiffel Tower, etc.). In some cases, analyzing sub-module 310 may recognize in-room decor and/or furniture. For example, analyzing sub-module 310 may recognize a headboard of a bed, a lampshade, curtains, and/or a picture or painting on the wall, etc., in a room. In some cases, analyzing sub-module 310 may recognize a photo taken outdoors, outside of the premises, outside an identifiable building (e.g., a landmark), etc. In some embodiments, analyzing sub-module 310 may recognize an occupant of the premises in a photo and/or a video (e.g., facial recognition, voice recognition, etc.). In one example, analyzing sub-module 310 may recognize grammar, word choice, punctuation specific to an occupant of the premises in a post on a social media site. Additionally, or alternatively, analyzing sub-module 310 may identify time stamp information associated with a post, photo, and/or video. For example, analyzing sub-module 310 may detect when a post was generated, when a photo was taken, and/or when a video was shot. Thus, analyzing sub-module 310 may identify metadata associated with a post, photo, and/or video associated with a social media account of an occupant of a premises.

In some embodiments, probability sub-module 315 may assess a probability of the premises being occupied based at least in part on the analyzing sub-module 310 identifying occupancy information based at least in part on the analysis of the social media data. The probability may include a future probability, which may relate to occupancy (e.g., based on learned patterns of behavior, etc.). In some cases, an occupant may post "On my way home," from which the analyzing sub-module 310 may determine the occupant is on his or her way to the premises. In some cases, analyzing sub-module 310 may identify location information associated with the post to determine a timeframe in which to expect the occupant to arrive to the premises. For example, analyzing sub-module 310 may identify a GPS tag associated with the post "On my way home" that indicates the occupant made the post while at work. Accordingly, probability sub-module 315 may assess a probability that the occupant will be arriving home within a predetermined time. In some cases, this predetermined time may be based on the distance between the occupant's work and home and/or based on tracked data associated with the occupant's commute and/or real-time traffic data identified by analyzing sub-module 310. In one example, upon the monitoring sub-module 305 detecting, in real-time, "I'm sick at home" being posted to a social media site of an occupant of the premises, along with the hashtags #feelingsick #athomesickday and/or location information included in the post, analyzing sub-module 310 may identify the posted text, parse and decipher the hashtags #feelingsick #athomesickday, and identify a location associated with the post. Based on this analysis, probability sub-module 315 may determine a high probability that the occupant is at home sick for the day and/or adjust an already determined probability relating to the occupant's location.

In one embodiment, probability sub-module 315 may assess the probability of occupancy in association with data from one or more sensors at the premises such as motion sensors, door switches, etc. The probability sub-module 315 may analyze the data from a sensor based at least in part on of data derived from a social media post. In one embodiment, the probability sub-module 315 may assign a greater weight to the data from the sensor. Alternatively, the probability sub-module 315 may assign a greater weight to the data derived from a social media post. And still alternatively, the system may receive other data (non-social media and non-sensor data) and the probability sub-module 315 may assign a greater weight to this third type, a certain weight to social media data, and the lowest weight to the sensor data. Thus, probability sub-module 315 may assess a 25% probability the premises is occupied based on detecting an occupant leaving the premises and the premises being armed to "Away." Upon identifying a social media post that indicates an occupant is away from the premises (e.g., "No rain in London today," GPS tag, hashtags, emoticons, etc.), the system may adjust the probability to 10% probability the premises is occupied.

In one embodiment, monitoring sub-module 305 may receive sensor data from a sensor located at the premises. The sensor may generate sensor data indicative of occupancy and/or non-occupancy. In some embodiments, analyzing sub-module 310 may analyze the sensor data based at least in part on a second parameter. In one embodiment, probability sub-module 315 may query data related to one or more sensors located at the premises. Analyzing sub-module 310 may analyze the occupancy data generated by the sensor. In some cases, upon detecting sensor data, monitoring sub-module 305 may be triggered to check for a post made by an occupant of the premises. Additionally, or alternatively, upon detecting social media data in a post made by an occupant of the premises, monitoring sub-module 305 may be triggered to check for sensor data from one or more sensors located at the premises. Accordingly, analyzing sub-module 310 in conjunction with probability sub-module 315 may analyze the detected social media data and/or sensor data to confirm a likelihood of occupancy and/or non-occupancy.

In some embodiments, probability sub-module 315 may assess a first probability of the premises being occupied based at least in part on analyzing sub-module 310 analyzing the social media data in relation to the first parameter. Probability sub-module 315 may assess a second probability of the premises being occupied based at least in part on analyzing sub-module 310 analyzing the sensor data in relation to the second parameter. In some embodiments, probability sub-module 315 may assess a first probability of the premises being occupied based at least in part on analyzing sub-module 310 analyzing the social media data of the first user. Additionally, or alternatively, probability sub-module 315 may assess a second probability of the premises being occupied based at least in part on analyzing sub-module 310 analyzing the social media data of the second user (e.g., friend, family member, or other type of social media connection of the first user).

Figure 4:
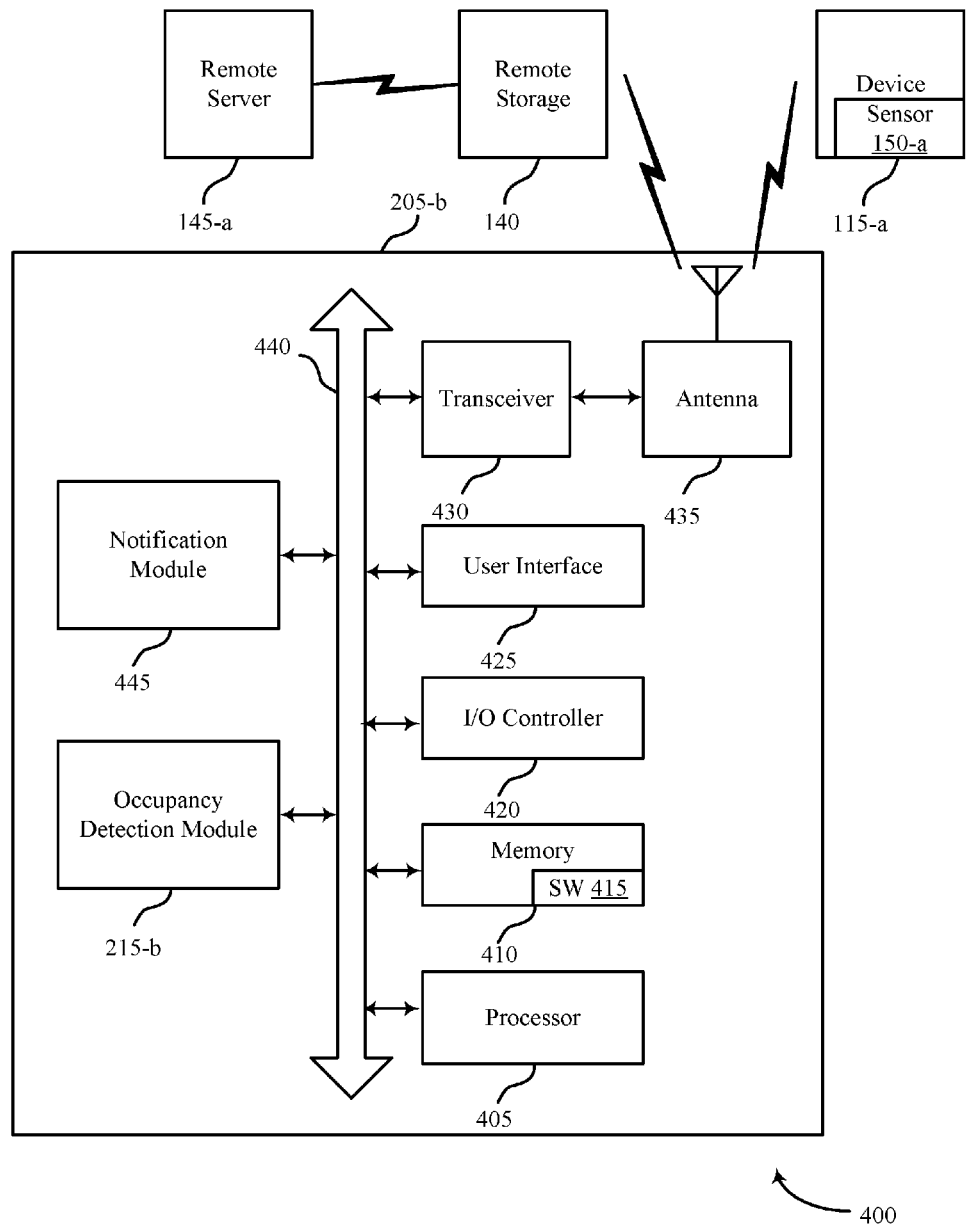
FIG. 4 shows a block diagram relating to a security and/or an automation system, in accordance with various aspects of this disclosure.

FIG. 4 shows a system 400 for use in security and/or automation systems, in accordance with various examples. System 400 may include an apparatus 205-b, which may be an example of the control panels 105 of FIG. 1 and/or another device. Apparatus 205-b may also be an example of one or more aspects of apparatus 205 of FIGS. 2 and 3 and/or device 115 of FIG. 1. Apparatus 205-b may include notification module 445. In some embodiments, the terms a control panel and a control device are used synonymously.

Apparatus 205-b may also include components for bi-directional voice and data communications including components for transmitting communications and components for receiving communications. For example, apparatus 205-b may communicate bi-directionally with one or more of device 115-a, one or more sensors 150-a, remote storage 140, and/or remote server 145-a. This bi-directional communication may be direct (e.g., apparatus 205-b communicating directly with remote storage 140) or indirect (e.g., apparatus 205-b communicating indirectly with remote server 145-a through remote storage 140).

In one embodiment, notification module 445 may generate and/or transmit a notification based at least in part on probability sub-module 315 assessing and/or adjusting a probability of a premises such as a home or office being occupied. For example, notification module 445 may send one or more notifications to one or more users based at least in part on whether the assessed probability exceeds a predetermined occupancy probability and/or confidence level threshold. For example, probability sub-module 315 may calculate a 75% probability the premises is occupied based on identifying a social media post that indicates an occupant is at the premises (e.g., "Working from home today," GPS tag, hashtags, emoticons, etc.). Upon detecting motion within the premises, the probability sub-module 315 may increase the probability to 100%. If the system is armed as "Away," then the occupant may be prompted to verify their identity and/or adjust the security status to "Stay," notify one or more users (including the person within the premises and/or another person), etc. The probability may be based at least in part on the analyzing sub-module 310 identifying occupancy information derived from the analyzing sub-module 310 analyzing the social media data. In some cases, the occupancy probability threshold may be determined in relation to sensor calibration, sensor sensitivity, user preference, past probability calculations, probability feedback loops, image quality, system limitations, etc.

Upon determining that the probability exceeds the predetermined occupancy probability threshold, the notification module 445 may generate a notification. In some cases, the notification may include a text message, an email, a computer generated phone call and/or a voicemail, and the like. In some cases, notification module 445 may generate a notification in association with an automation/security system. For example, notification module 445 may generate an audio notification such as a chime and/or a computer-generated voice announcement related to a control panel (e.g., control panel 105) and/or using one or more speakers of the automation/security system.

Apparatus 205-b may also include a processor module 405, and memory 410 (including software (SW) 415), an input/output controller module 420, a user interface module 425, a transceiver module 430, and one or more antennas 435 each of which may communicate directly or indirectly with one another (e.g., via one or more buses 440). The transceiver module 430 may communicate bi-directionally, via the one or more antennas 435, wired links, and/or wireless links, with one or more networks or remote devices as described above.

For example, the transceiver module 430 may communicate bi-directionally with one or more of device 115-a, remote storage 140, and/or remote server 145-a. The transceiver module 430 may include a modem to modulate the packets and provide the modulated packets to the one or more antennas 435 for transmission, and to demodulate packets received from the one or more antenna 435. While a control panel or a control device (e.g., 205-b) may include a single antenna 435, the control panel or the control device may also have multiple antennas 435 capable of concurrently transmitting or receiving multiple wired and/or wireless transmissions. In some embodiments, one element of apparatus 205-b (e.g., one or more antennas 435, transceiver module 430, etc.) may provide a direct connection to a remote server 145 via a direct network link to the Internet via a POP (point of presence). In some embodiments, one element of apparatus 205-b (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 150-a (e.g., motion, proximity sensor, smoke, glass break, door, window, carbon monoxide, and/or another sensor) may connect to some element of system 400 via a network using one or more wired and/or wireless connections. These one or more sensors 150-a may provide input related to the systems and methods described herein, including but not limited to the sub-modules discussed for occupancy detection module 215-a In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of apparatus 205-b (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., monitoring a social media account associated with an occupant and detecting occupancy based on data obtained from the social media account, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein.

In some embodiments, the processor module 405 may include, among other things, an intelligent hardware device (e.g., a central processing unit (CPU), a microcontroller, and/or an ASIC, etc.). The memory 410 can contain, among other things, the Basic Input-Output system (BIOS) which may control basic hardware and/or software operation such as the interaction with peripheral components or devices. For example, the notification module 445 to implement the present systems and methods may be stored within the memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the apparatus 205-b may include a single antenna 435, the apparatus 205-b may have multiple antennas 435 capable of concurrently transmitting and/or receiving multiple wireless transmissions.

The apparatus 205-b may include an occupancy detection module 215-b, which may perform at least the functions described above for the occupancy detection modules 215 of apparatus 205 of FIGS. 2 and/or 3.

Figure 5:
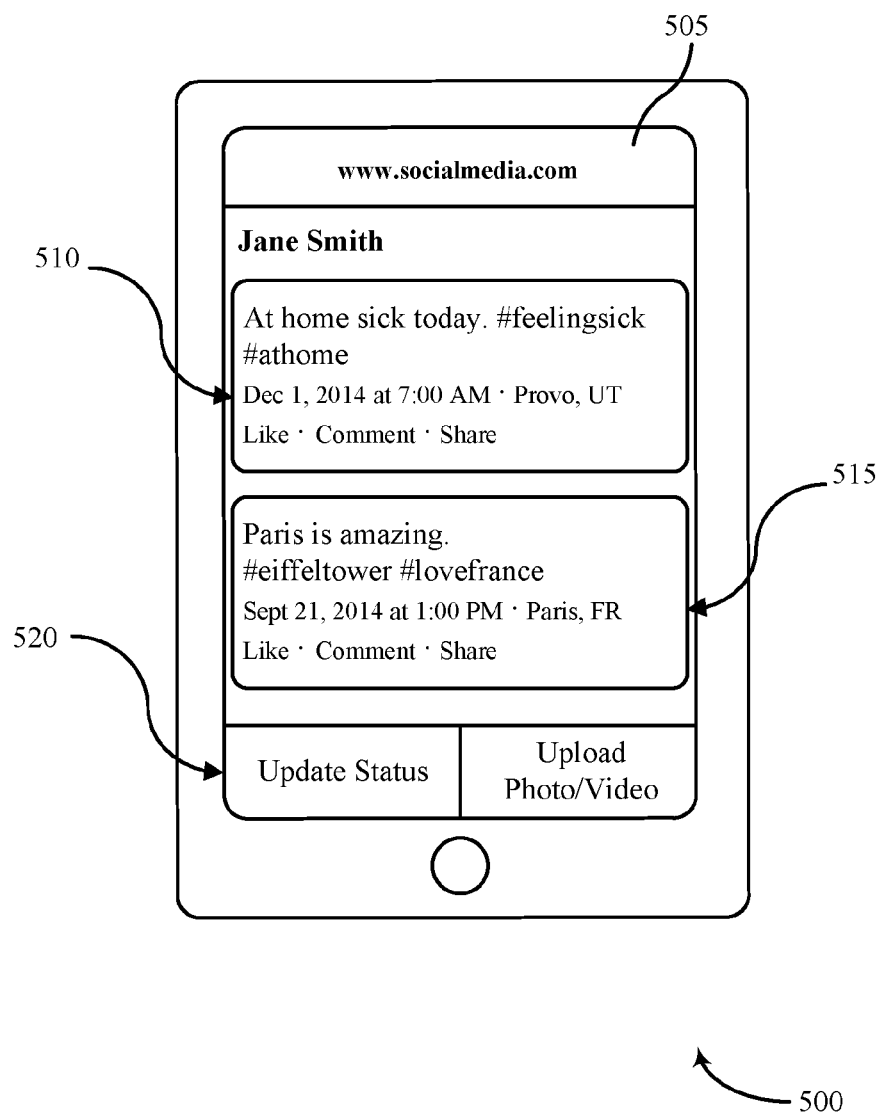
FIG. 5 shows a block diagram of an apparatus relating to a security and/or an automation system, in accordance with various aspects of this disclosure.

FIG. 5 depicts a block diagram of an apparatus 500 relating to a security and/or an automation system, in accordance with various aspects of this disclosure. Apparatus 500 may be an example of the control panels 105 of FIG. 1 and/or another device such as a desktop, laptop, or mobile computing device. Apparatus 500 may also be an example of one or more aspects of apparatus 205 of FIGS. 2 and 3 and/or device 115 of FIG. 1.

As depicted, apparatus 500 may display a social media site. The display may be part of a website and/or a user interface of a mobile application. For example, as depicted, the social media site may include user interface button 520 to enable a user to update a status and/or to upload photos or videos.

A title area 505 may indicate the name of the social media site (e.g., FACEBOOK®, TWITTER®, PINTEREST®, LINKEDIN®, GOOGLE+®, etc.) associated with an account of a user, such as an occupant of the premises (e.g., "Jane Smith" as depicted) and/or a person associated with a premises. A current status 510 may include information related to the occupant. For example, the current status 510 may indicate that Jane Smith is at home sick. The current status 510 may include additional information such as emoticons and hashtags (e.g., ☺,, #feelingsick, #athome, etc.). The current status 510 may also include a timestamp (e.g., Dec. 1, 2014 at 7:00 AM) and location information (e.g., the post was made while Jane Smith was in Provo, Utah). Upon determining when the post was made (e.g., on the present day) and/or that the location matches a certain location (e.g., the home location information associated with Jane Smith), apparatus 500 may determine a probability and/or a confidence level that Jane Smith is presently occupying her home.

A previous status 515 may include information indicating that Jane Smith is and/or was away from her home. For example, as depicted, the previous status 515 includes the text "Paris is amazing," the emoticon ☺,, and hashtags #eiffeltower and #lovefrance. Also, the previous status 515 may include location information "Paris FR" and timestamp "Sept. 21, 2014 at 1:00 PM." Based at least in part on such information, apparatus 500 may determine that Jane Smith is away from her home. Based at least in part on such social media data, apparatus 500 may gather data from one or more sensors at the home of Jane Smith to verify that Jane Smith is away from her home.

In some cases, a social media post may include identification information such as the name of a user that made the post. Thus, the current status 510 may include information such as text (e.g., "posted by Jane Smith"), internet protocol (IP) address, and/or metadata indicating who made the post. In some cases, social media connections or contacts of Jane Smith may post information to Jane Smith's social media page. For example, a friend, co-worker, or family member of Jane Smith's may post information to Jane Smith's social media page. The connection may post that he or she is sick. Apparatus 500 may then determine a probability that Jane Smith will get sick within a predetermined time period, and based on this information, may monitor for future posts by Jane Smith indicating that she is sick. In some cases, a connection of Jane Smith may post information to Jane Smith's page indicating that Jane Smith is with the connection at a location identified in the post. Accordingly, apparatus 500 may acquire occupancy-related information from posts made by the connections of Jane Smith. Accordingly, apparatus 500 may be configured to detect and/or verify occupancy of a premises based on data acquired from a social media site.

Figure 6:
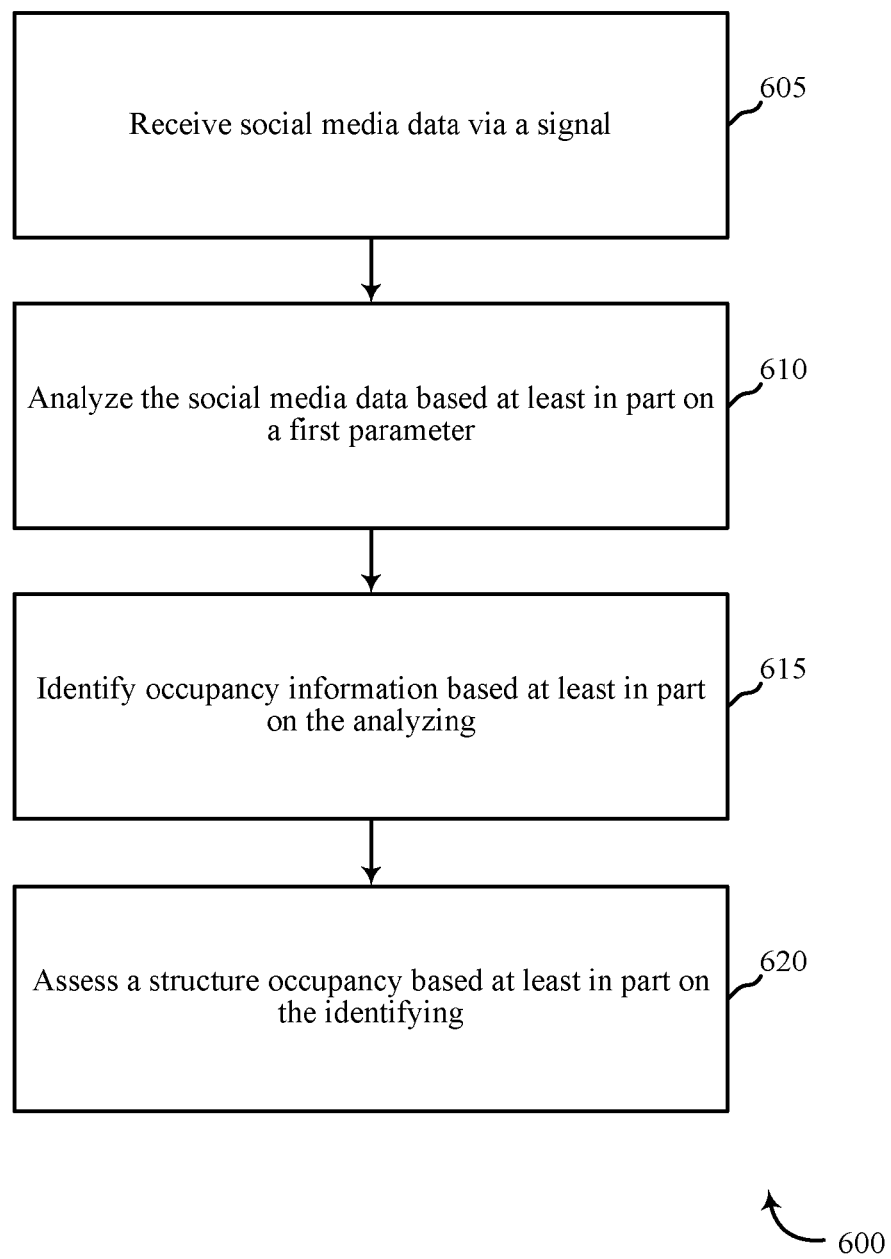
FIG. 6 is a flow chart illustrating examples of methods relating to a security and/or an automation system, in accordance with various aspects of this disclosure.

FIG. 6 is a flow chart illustrating an example of a method 600 for security and/or an automation system, in accordance with various aspects of the present disclosure. For clarity, the method 600 is described below with reference to aspects of one or more of the elements and features described with reference to FIGS. 1 and/or 2, and/or aspects of one or more of the elements and features described with reference to FIGS. 3 and/or 4. In some examples, a control panel, backend server, device, and/or sensor may execute one or more sets of codes to control the functional elements of the control panel, backend server, device, and/or sensor to perform the functions described below. Additionally or alternatively, the control panel, backend server, device, and/or sensor may perform one or more of the functions described below using special-purpose hardware. The operation(s) of any one of blocks 605-620 may be performed using the occupancy detection modules 215 described with reference to FIGS. 2-4.

At block 605, social media data may be received via a signal. At block 610, the social media data may be analyzed based at least in part on a first parameter. The first parameter may include at least one of a word, a phrase, a character combination, an emoticon, a hashtag, a photo, a video, an object recognition, location information (e.g., GPS tag on a post and/or a posted photo, etc.), facial recognition, object detection, and time stamp information, among others. At block 615, occupancy information may be identified based at least in part on the analyzing. For example, text stating "I'm sick at home" may indicate that an occupant is at home. At block 620, a structure occupancy may be assessed based at least in part on the identifying.

Thus, the method 600 may provide for occupancy detection by social media relating to automation/security systems. It should be noted that the method 600 is just one implementation and that the operations of the method 600 may be rearranged or otherwise modified such that other implementations are possible.

Figure 7:
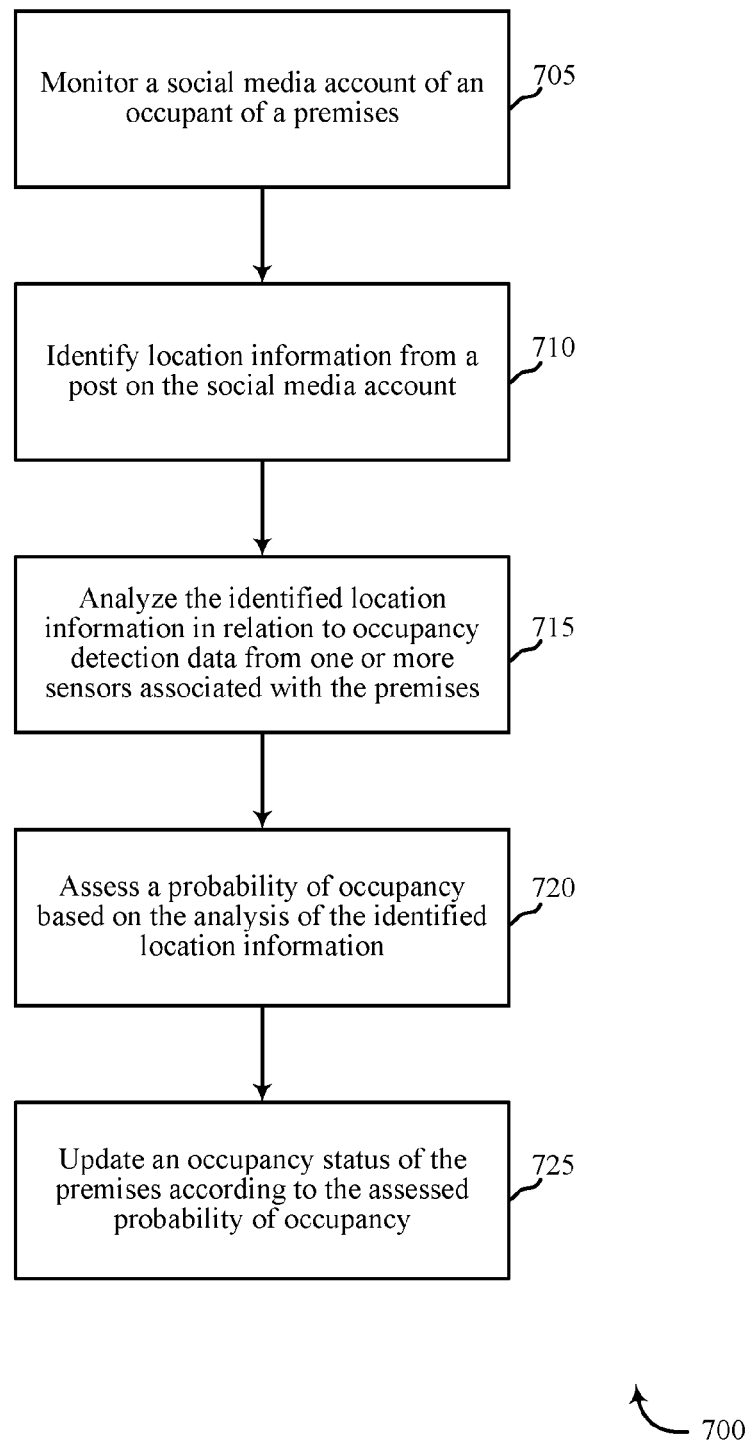
FIG. 7 is a flow chart illustrating examples of methods relating to a security and/or an automation system, in accordance with various aspects of this disclosure.

FIG. 7 is a flow chart illustrating an example of a method 700 for security and/or an automation system, in accordance with various aspects of the present disclosure. For clarity, the method 700 is described below with reference to aspects of one or more of the elements and features described with reference to FIGS. 1 and/or 2, and/or aspects of one or more of the elements and features described with reference to FIGS. 3 and/or 4. In some examples, a control panel, backend server, device, and/or sensor may execute one or more sets of codes to control the functional elements of the control panel, backend server, device, and/or sensor to perform the functions described below. Additionally or alternatively, the control panel, backend server, device, and/or sensor may perform one or more of the functions described below using special-purpose hardware. The operation(s) of any one of blocks 705-725 may be performed using the occupancy detection modules 215 described with reference to FIGS. 2-4.

At block 705, a social media account of an occupant of a premises may be monitored. At block 710, location information may be identified from a post on the social media account. At block 715, the identified location information may be analyzed in relation to occupancy detection data from one or more sensors associated with the premises. A time the post was made may be identified to determine the information's accuracy. Additionally, or alternatively, the identified location information may be analyzed in relation to learned pattern behavior (e.g., when an occupant usually leaves for the home, when the occupant typically returns home, etc.). At block 720, a probability of occupancy may be assessed based on the analysis of the identified location information. At block 725, an occupancy status of the premises may be updated according to the assessed probability of occupancy.

Thus, the method 700 may provide for occupancy detection by social media relating to automation/security systems. It should be noted that the method 700 is just one implementation and that the operations of the method 700 may be rearranged or otherwise modified such that other implementations are possible.

Figure 8:
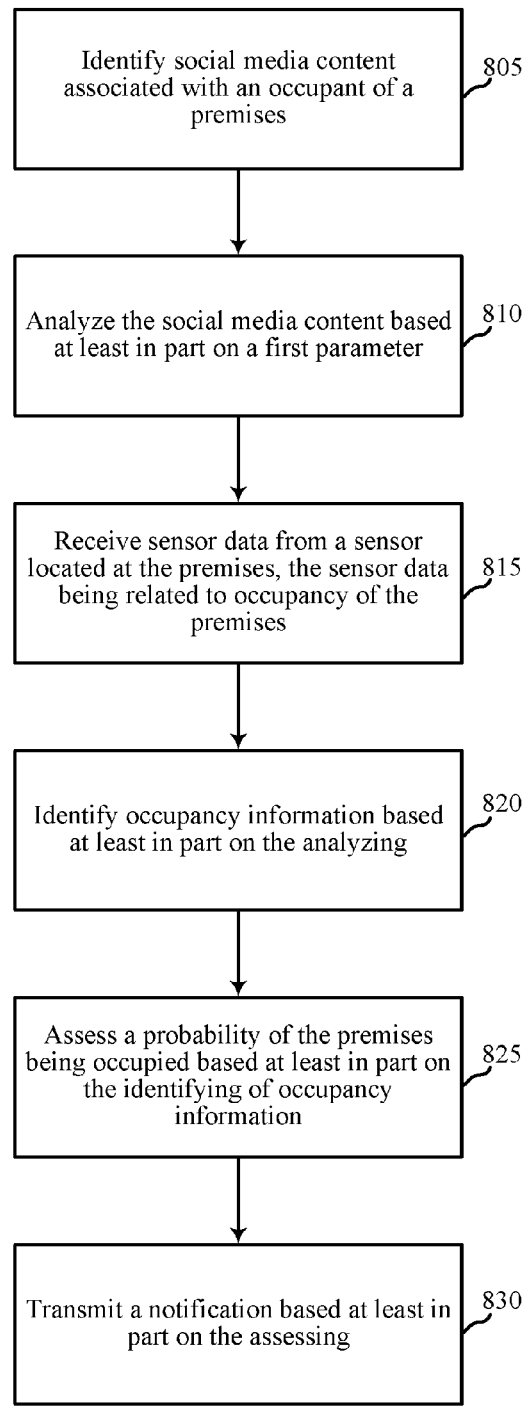
FIG. 8 is a flow chart illustrating examples of methods relating to a security and/or an automation system, in accordance with various aspects of this disclosure.

FIG. 8 is a flow chart illustrating an example of a method 800 for security and/or an automation system, in accordance with various aspects of the present disclosure. For clarity, the method 800 is described below with reference to aspects of one or more of the elements and features described with reference to FIGS. 1 and/or 2, and/or aspects of one or more of the elements and features described with reference to FIGS. 3 and/or 4. In some examples, a control panel, backend server, device, and/or sensor may execute one or more sets of codes to control the functional elements of the control panel, backend server, device, and/or sensor to perform the functions described below. Additionally or alternatively, the control panel, backend server, device, and/or sensor may perform one or more of the functions described below using special-purpose hardware. The operation(s) of any one of blocks 805-830 may be performed using the occupancy detection modules 215 described with reference to FIGS. 2-4.

At block 805, social media content associated with an occupant of a premises may be identified. The social media content may include data of at least first and second social media users. At block 810, the social media content may be analyzed based at least in part on a first parameter. The first parameter may include at least one of a word, a phrase, a character combination, an emoticon, a hashtag, a photo, a video, location information (e.g., GPS tag on a post and/or a posted photo, etc.), facial recognition, object detection, an object recognition, and time stamp information. At block 815, sensor data may be received from a sensor located at the premises, the sensor data being related to occupancy of the premises. In some cases, the analyzing may include analyzing the sensor data. At block 820, occupancy information may be identified based at least in part on the analyzing. At block 825, a probability of the premises being occupied may be assessed based at least in part on the identifying of occupancy information. In some cases, a first probability of the premises occupancy based at least in part on analyzing the social media data based at least in part on a first parameter, and a second probability of the premises occupancy based at least in part on analyzing the sensor data based at least in part on a second parameter. The second parameter may include motion detection and/or data from various automation and/or security sensors such as door/window sensors, proximity sensors, camera sensors, etc. In some cases, assessing a first probability of the premises occupancy may be based at least in part on analyzing the social media data of a first social media user and assessing a second probability of the premises occupancy may be based at least in part on analyzing the social media data of a second social media user. In some cases, the one or more probabilities being assessed may include a future probability of the premises occupancy. At block 830, a notification based at least in part on the assessing may be transmitted.

Thus, the method 800 may provide for occupancy detection by social media relating to automation/security systems. It should be noted that the method 800 is just one implementation and that the operations of the method 800 may be rearranged or otherwise modified such that other implementations are possible.

In some examples, aspects from two or more of the methods 600, 700, and/or 800 may be combined and/or separated. It should be noted that the methods 600, 700, and 800 are just example implementations, and that the operations of the methods 600-800 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for a security and/or automation system, comprising:
    receiving social media data via a signal;
    analyzing the social media data based at least in part on a first parameter to determine a first occupancy information at a structure, wherein the first occupancy information comprises a current occupancy information at the structure based at least in part on a location of a user of the security and/or automation system;
    identifying a first probability associated with the first occupancy information based at least in part on a first weight assigned to the determined first occupancy information;
    assigning a second weight to a second occupancy information determined from sensor data received from a sensor located at the structure, the sensor including at least one of a motion sensor, camera sensor, thermostat sensor, proximity sensor, or audio sensor, or any combination thereof, wherein the second occupancy information comprises the current occupancy information at the structure based at least in part on a schedule of the user;
    modifying the first probability based at least in part on a weighted first occupancy information and a weighted second occupancy information, wherein the modified probability comprises a future probability of the user occupying the structure within a predetermined time; and
    assessing a structure occupancy based at least in part on the modified probability.

2. The method of claim 1, comprising:
    receiving sensor data from the sensor located at the structure, the sensor data being related to the structure occupancy; and
    wherein the analyzing further comprises analyzing the sensor data.

3. The method of claim 2, comprising:
    analyzing the sensor data based at least in part on a second parameter.

4. The method of claim 3, wherein assessing the structure occupancy comprises:
    assessing the first probability associated with the first occupancy information based at least in part on analyzing the social media data based at least in part on the first parameter; and assessing a second probability associated with the second occupancy information based at least in part on analyzing the sensor data based at least in part on the second parameter.

5. The method of claim 4, wherein at least one of the first probability and the second probability comprises the future probability.

6. The method of claim 1, wherein the first parameter comprises:
at least one of a word, a phrase, a character combination, an emoticon, a hashtag, a photo, a video, an object recognition, and a location.

7. The method of claim 1, comprising:
transmitting a notification based at least in part on the assessing.

8. The method of claim 1, wherein the social media data comprises:
social media data of at least a first user and a second user.

9. The method of claim 8, wherein assessing the structure occupancy comprises:
assessing the first probability associated with the first occupancy information based at least in part on analyzing the social media data of the first user; and
assessing a second probability associated with the first occupancy information based at least in part on analyzing the social media data of the second user.

10. The method of claim 1, wherein the first parameter comprises:
at least one of an object detection, a facial recognition, a time stamp information, and a global positioning system (GPS) tag.

11. An apparatus for a security and/or automation system, comprising:
a processor;
memory in electronic communication with the processor; and
instructions stored in the memory, the instructions being executable by the processor to:
receive social media data via a signal;
analyze the social media data based at least in part on a first parameter to determine a first occupancy information at a structure, wherein the first occupancy information comprises a current occupancy information at the structure based at least in part on a location of a user of the security and/or automation system;
identify a first probability associated with the first occupancy information based at least in part on a first weight assigned to the determined first occupancy information;
assigning a second weight to a second occupancy information determined from sensor data received from a sensor located at the structure, the sensor including at least one of a motion sensor, camera sensor, thermostat sensor, proximity sensor, or audio sensor, or any combination thereof, wherein the second occupancy information comprises the current occupancy information at the structure based at least in part on a schedule of the user;
modify the first probability based at least in part on a weighted first occupancy information and a weighted second occupancy information, wherein the modified probability comprises a future probability of the user occupying the structure within a predetermined time; and
assess a structure occupancy based at least in part on the modified probability.

12. The apparatus of claim 11, the instructions being executable by the processor to:
receive sensor data from the sensor located at the structure, the sensor data being related to the structure occupancy; and
wherein the analyzing further comprises analyzing the sensor data.

13. The apparatus of claim 12, the instructions being executable by the processor to:
analyze the sensor data based at least in part on a second parameter.

14. The apparatus of claim 13, wherein assessing the probability of the structure occupancy comprises:
assessing the first probability associated with the first occupancy information based at least in part on analyzing the social media data based at least in part on the first parameter; and
assessing a second probability associated with the second occupancy information based at least in part on analyzing the sensor data based at least in part on the second parameter.

15. The apparatus of claim 14, wherein at least one of the first probability and the second probability comprises the future probability.

16. The apparatus of claim 11, wherein the first parameter comprises:
at least one of a word, a phrase, a character combination, an emoticon, a hashtag, a photo, a video, an object recognition, and a location.

17. The apparatus of claim 11, the instructions being executable by the processor to:
transmitting a notification based at least in part on the assessing.

18. The apparatus of claim 11, wherein the social media data comprises social media data of at least a first user and a second user.

19. The apparatus of claim 18, wherein assessing of the structure occupancy comprises:
assessing the first probability associated with the first occupancy information based at least in part on analyzing the social media data of the first user; and
assessing a second probability associated with the first occupancy information based at least in part on analyzing the social media data of the second user.

20. A non-transitory computer-readable medium storing computer-executable code for a security and/or automation system, the code executable by a processor to:
receive social media data via a signal;
analyze the social media data based at least in part on a first parameter to determine a first occupancy information at a structure, wherein the first occupancy information comprises a current occupancy information at the structure based at least in part on a location of a user of the security and/or automation system;
identify a first probability associated with the first occupancy information based at least in part on a first weight assigned to the determined first occupancy information;
assigning a second weight to a second occupancy information determined from sensor data received from a sensor located at the structure, the sensor including at least one of a motion sensor, camera sensor, thermostat sensor, proximity sensor, or audio sensor, or any combination thereof, wherein the second occupancy information comprises the current occupancy information at the structure based at least in part on a schedule of the user;

modify the first probability based at least in part on a weighted first occupancy information and a weighted second occupancy information, wherein the modified probability comprises a future probability of the user occupying the structure within a predetermined time; and assess a structure occupancy based at least in part on the modified probability.

\* \* \* \* \*